(12) United States Patent
Kimura et al.

(10) Patent No.: US 11,087,197 B2
(45) Date of Patent: Aug. 10, 2021

(54) ATTENTION TAG FOR RETAIL ARTICLE AND RETAIL ARTICLE HAVING SAME ATTACHED THERETO

(71) Applicant: Murata Manufacturing Co., Ltd., Nagaokakyo (JP)

(72) Inventors: Ikuhei Kimura, Nagaokakyo (JP); Noboru Kato, Nagaokakyo (JP); Kunihiro Komaki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 64 days.

(21) Appl. No.: 16/233,483

(22) Filed: Dec. 27, 2018

(65) Prior Publication Data

US 2019/0130239 A1    May 2, 2019

Related U.S. Application Data

(63) Continuation of application No. PCT/JP2017/024977, filed on Jul. 7, 2017.

(30) Foreign Application Priority Data

Jul. 14, 2016  (JP) .............................. JP2016-139563

(51) Int. Cl.
  *G06K 19/077*  (2006.01)
  *H01Q 1/22*   (2006.01)
  (Continued)

(52) U.S. Cl.
  CPC ... *G06K 19/0776* (2013.01); *G06K 19/07784* (2013.01); *G06K 19/07788* (2013.01);
  (Continued)

(58) Field of Classification Search
  CPC ......... G06K 19/0776; G06K 19/07784; G06K 19/07788; G09F 3/0297; H04W 4/35
  See application file for complete search history.

(56) References Cited

U.S. PATENT DOCUMENTS 8,410,938 B2 *  4/2013  Sakama ........... G06K 19/07749
                                                340/10.1
8,851,387 B2 * 10/2014  Kuo ................ G06K 19/07771
                                                235/492

(Continued)

FOREIGN PATENT DOCUMENTS

JP      200769975 A     3/2007
JP     2007164399 A     6/2007
(Continued)

OTHER PUBLICATIONS

International Search Report issued in PCT/JP2017/024977, dated Sep. 26, 2017.
(Continued)

*Primary Examiner* — Christle I Marshall
(74) *Attorney, Agent, or Firm* — Arent Fox LLP

(57) ABSTRACT

An attention tag for a retail article that includes a label having an adhesive region bonded to a retail article and a protruding region that protrudes from the retail article when the label is attached thereto. Moreover, an RFID tag is disposed on the label and includes an RFIC element and an antenna pattern including first and second antenna portions that are respectively connected to first and second ends of the RFIC element. Moreover, the first antenna portion is disposed in the protruding region of the label while the second antenna portion of the RFID tag is disposed in the adhesive region of the label at a position facing a portion of the retail article.

20 Claims, 15 Drawing Sheets

(51) Int. Cl.
    *H01Q 9/16*     (2006.01)
    *H04W 4/35*     (2018.01)
    *G09F 3/00*     (2006.01)
    *G09F 3/10*     (2006.01)
    *G09F 3/02*     (2006.01)

(52) U.S. Cl.
    CPC .............. *G09F 3/0297* (2013.01); *G09F 3/10* (2013.01); *H01Q 1/2225* (2013.01); *H01Q 9/16* (2013.01); *H04W 4/35* (2018.02); *G09F 2003/0273* (2013.01); *G09F 2003/0276* (2013.01)

(56) References Cited

U.S. PATENT DOCUMENTS

| | | | |
|---|---|---|---|
| 8,960,560 B2 * | 2/2015 | Hsieh | G06K 19/07771 |
| | | | 235/487 |
| 10,164,321 B2 | 12/2018 | Kimura | |
| 10,586,143 B2 * | 3/2020 | Kato | H01Q 21/28 |
| 2004/0078957 A1 | 4/2004 | Forster | |
| 2006/0092027 A1 * | 5/2006 | Ito | G06K 19/04 |
| | | | 340/572.7 |
| 2007/0139205 A1 | 6/2007 | Tanaka et al. | |
| 2012/0006904 A1 * | 1/2012 | Kato | G06K 19/07756 |
| | | | 235/492 |
| 2013/0050047 A1 | 2/2013 | Carr | |
| 2013/0186961 A1 | 7/2013 | Kimura et al. | |
| 2013/0194149 A1 | 8/2013 | Kimura | |
| 2014/0071017 A1 | 3/2014 | Kimura et al. | |
| 2014/0166764 A1 | 6/2014 | Kimura et al. | |
| 2014/0184390 A1 * | 7/2014 | Elizondo, II | G06K 19/07786 |
| | | | 340/10.1 |
| 2015/0353234 A1 * | 12/2015 | Yagishita | G06K 19/07798 |
| | | | 206/216 |

FOREIGN PATENT DOCUMENTS

| | | | |
|---|---|---|---|
| JP | 2010072737 A | * | 4/2010 |
| JP | 2010086198 A | * | 4/2010 |
| JP | 2010218537 A | | 9/2010 |
| JP | 4674638 B2 | | 4/2011 |
| JP | 2013020469 A | * | 1/2013 |
| JP | 2013020469 A | | 1/2013 |
| JP | 2016062576 A | * | 4/2016 |
| JP | 2016062576 A | | 4/2016 |
| JP | 6439344 B2 | * | 12/2018 |
| WO | 2006016559 A1 | | 2/2006 |
| WO | 2012093541 A1 | | 7/2012 |
| WO | 2012117843 A1 | | 9/2012 |
| WO | 2015111466 A1 | | 7/2015 |
| WO | 2015115170 A1 | | 8/2015 |

OTHER PUBLICATIONS

Written Opinion of the International Searching Authority issued in PCT/JP2017/024977, dated Sep. 26, 2017.

* cited by examiner

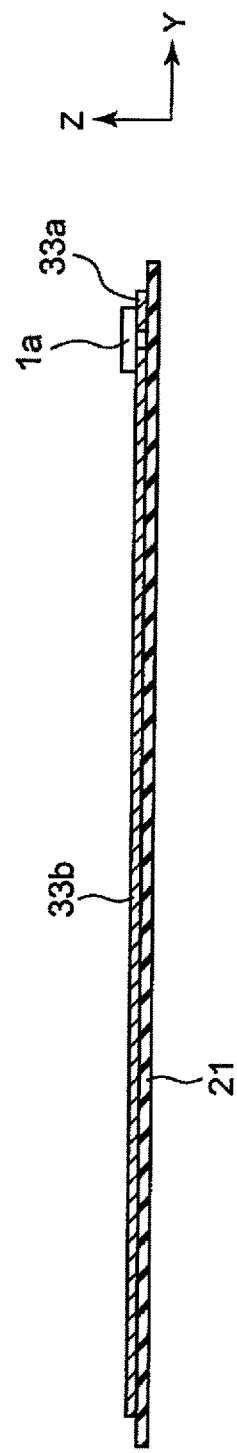

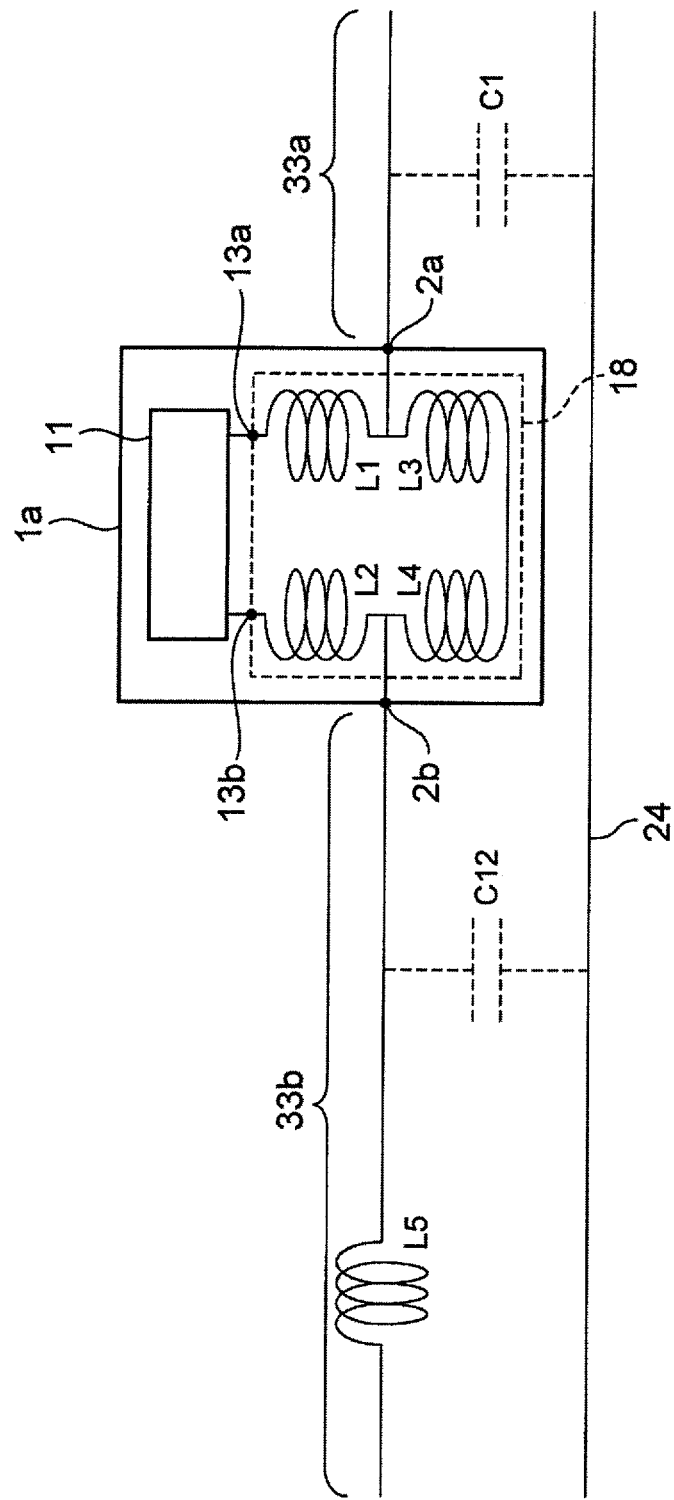

ATTENTION TAG FOR RETAIL ARTICLE AND RETAIL ARTICLE HAVING SAME ATTACHED THERETO

CROSS REFERENCE TO RELATED APPLICATIONS

The present application is a continuation of PCT/JP2017/024977 filed Jul. 7, 2017, which claims priority to Japanese Patent Application No. 2016-139563, filed Jul. 14, 2016, the entire contents of each of which are incorporated herein by reference.

TECHNICAL FIELD

The present disclosure relates to an attention tag for a retail article and a retail article having the same attached thereto.

BACKGROUND

A UHF band RFID system has a long communication distance, can read multiple tags at the same time, and is therefore expected to be applied to management of retail articles (e.g., management of forward stocks and collective checkout processing). For a retail article having a UHF band RFID tag attached thereto, known structures include those having a tag directly attached to an article body (see, e.g., Patent Document 1) and those having a tag attached such that the tag is floated from an article body (see, e.g., Patent Document 2).

Patent Document 1: Japanese Patent No. 4674638.
Patent Document 2: Japanese Laid-Open Patent Publication No. 2007-69975.

However, when the tag is directly attached to the article body, an effective electrical length of an antenna changes depending on a material (e.g., permittivity) of the article body, and therefore, a tag corresponding to the type thereof is required. Particularly, when the article body is metal, the antenna gain considerably decreases.

On the other hand, when the tag is attached in a floating state with respect to the article body, the tag is hardly affected by the article body. However, when the article body is metal, the tag cannot be read from the side opposite thereto, so that reading must be performed from multiple directions.

SUMMARY OF THE INVENTION

It is therefore an object of the present invention to provide an attention tag for a retail article that achieve a high antenna gain regardless of a material of the retail article.

Accordingly, an attention tag for a retail article according to an exemplary embodiment is disclosed that includes a label part including an adhesive region bonded to a retail article and a protruding region protruding from the retail article. Moreover, an RFID tag is disposed on the label part and includes an RFIC element and an antenna pattern including a first antenna part and a second antenna part respectively connected to respective ends of the RFIC element. According to the exemplary aspect, the first antenna part of the RFID tag is disposed in the protruding region of the label part while the second antenna part of the RFID tag is disposed in the adhesive region of the label part at a position facing the retail article.

Moreover, a retail article according to an exemplary embodiment has an attention tag attached thereto, with the attention tag including a label part including an adhesive region bonded to the retail article and a protruding region protruding from the retail article. Moreover, an RFID tag is disposed on the label part and includes an RFIC element and an antenna pattern including a first antenna part and a second antenna part respectively connected to first and second ends of the RFIC element. In this aspect, the first antenna part of the RFID tag is disposed in the protruding region of the label part while the second antenna part of the RFID tag is disposed in the adhesive region of the label part at a position facing a portion of the retail article.

According to the attention tag for a retail article according to the exemplary embodiment, even when the retail article comprises a metal body, the metal body can be used as a booster antenna by the second antenna part disposed in the adhesive region of the label part at a position facing a portion of the retail article. As a result, a high antenna gain is obtained regardless of a material of the retail article.

BRIEF DESCRIPTION OF DRAWINGS

FIG. 7B is a schematic cross-sectional view of FIG. 7A.

FIG. 8 is an equivalent circuit diagram of an RFID tag included in the attention tag for a retail article of FIG. 7A.

DETAILED DESCRIPTION

Figure 1A:
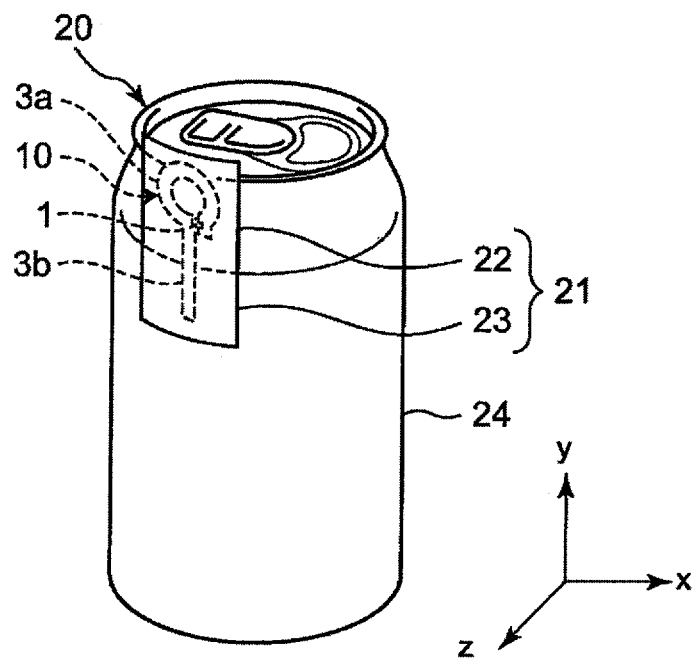
FIG. 1A is a schematic perspective view showing a state in which an attention tag for a retail article according to a first exemplary embodiment is attached to a retail article.

An attention tag for a retail article according to a first exemplary aspect comprises a label part including an adhesive region bonded to a retail article and a protruding region protruding from the retail article. Moreover, an RFID tag is disposed on the label part and includes an RFIC element and an antenna pattern including a first antenna part and a second antenna part respectively connected to one end portion and the other end portion of the RFIC element. According to the exemplary aspect, the first antenna part of the RFID tag is disposed in the protruding region of the label part while the second antenna part of the RFID tag is disposed in the adhesive region of the label part at a position facing a portion of the retail article.

According to the configuration, even when the retail article is a metal body, the metal body can be configured as a booster antenna by the second antenna part disposed in the adhesive region of the label part at a position facing a portion of the retail article. As such, a high antenna gain is obtained regardless of a material of the retail article.

In the attention tag for a retail article according to a second exemplary aspect, the first antenna part and the second antenna part may have shapes asymmetrical to each other about the RFIC element in the configuration of the first aspect of the invention.

In the attention tag for a retail article according to a third exemplary aspect, the first antenna part may be a loop part connecting the one end portion and the other end portion of the RFIC element while the second antenna part is a lead part protruding from the vicinity of the other end portion.

In the attention tag for a retail article according to a forth exemplary aspect, the antenna pattern may not include a loop part connecting the one end portion and the other end portion of the RFIC element.

According to the exemplary configuration, a loop part constituting a matching circuit may not be disposed in the antenna pattern. In this case, for example, a loop part connecting the one end portion and the other end portion of the RFIC element and constituting a matching circuit may be disposed in the RFIC element.

In the attention tag for a retail article according to a fifth exemplary aspect, the first antenna part may extend from one end portion of the RFIC element in a first direction while the second antenna part may extend from the other end portion of the RFIC element in a second direction opposite to the first direction.

In the attention tag for a retail article according to a sixth exemplary aspect of the invention, a longitudinal direction of the first antenna part may substantially be orthogonal to a longitudinal direction of the second antenna part.

In the attention tag for a retail article according to a seventh exemplary aspect of the invention, the RFIC element may be configured as an RFIC package including an RFIC chip and a matching circuit connected to the RFIC chip, and the matching circuit may define a resonance frequency corresponding to a communication frequency.

In the attention tag for a retail article according to an eight exemplary aspect of the invention, the electrical length of the first antenna part may be shorter than the electrical length of the second antenna part.

In the attention tag for a retail article according to a ninth exemplary aspect, the label part can be configured to be attached to the retail article with an insulating adhesive.

A retail article according to a tenth exemplary aspect is a retail article having an attention tag for a retail article attached thereto. In this aspect, the attention tag includes a label part including an adhesive region bonded to the retail article and a protruding region protruding from the retail article. Moreover, an RFID tag is disposed on the label part and includes an RFIC element and an antenna pattern including a first antenna part and a second antenna part respectively connected to one end portion and the other end portion of the RFIC element. Furthermore, the first antenna part of the RFID tag is disposed in the protruding region of the label part while the second antenna part of the RFID tag is disposed in the adhesive region of the label part at a position facing a portion of the retail article.

An attention tag for a retail article according to the exemplary embodiments will now be described with reference to the accompanying drawings. In the drawings, substantially the same members are denoted by the same reference numerals.

First Embodiment

Figure 1B:
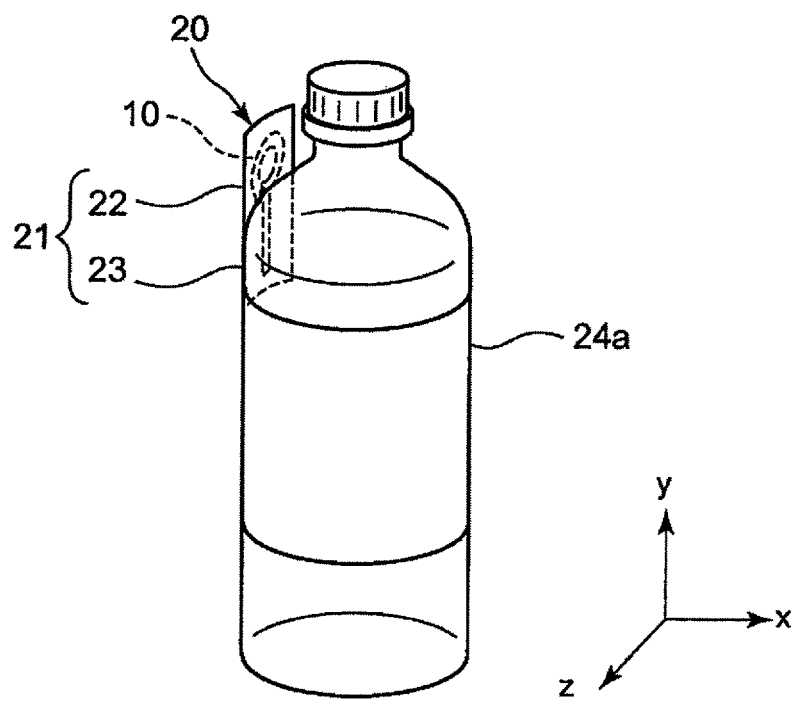
FIG. 1B is a schematic perspective view showing a state in which the attention tag for a retail article according to the first exemplary embodiment is attached to another retail article.
Figure 1C:
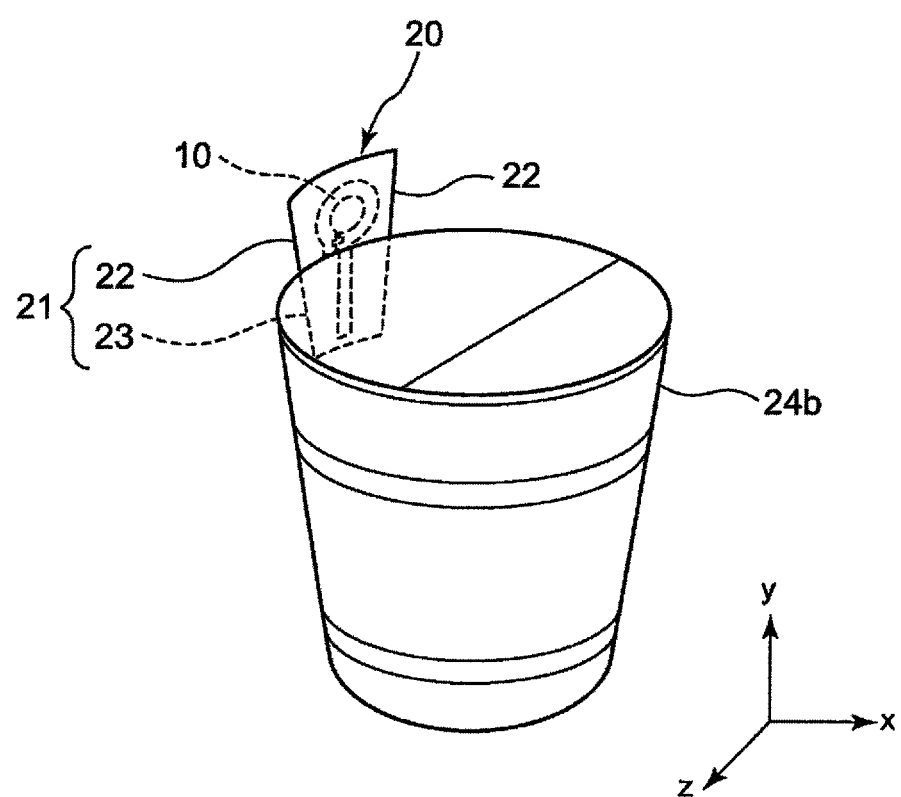
FIG. 1C is a schematic perspective view showing a state in which the attention tag for a retail article according to the first exemplary embodiment is attached to a further retail article.
Figure 2:
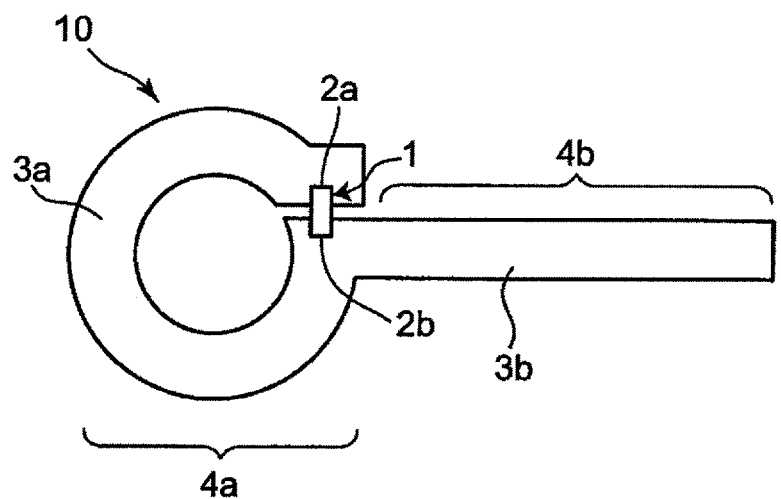
FIG. 2 is a plan view showing a configuration of an RFID tag used for the attention tag for a retail article according to the first exemplary embodiment.
Figure 3:
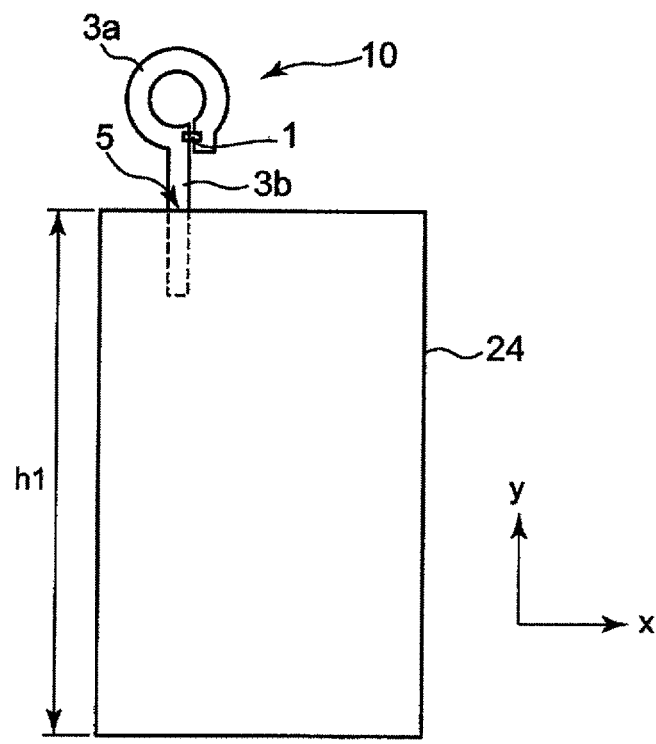
FIG. 3 is a schematic view showing a relationship between the RFID tag and a metal body when the attention tag for a retail article of FIG. 1A is attached to a retail article that is the metal body.

FIG. 1A is a schematic perspective view showing a state in which an attention tag 20 for a retail article according to a first embodiment is attached to a retail article (metal body) 24. FIG. 1B is a schematic perspective view showing a state in which the attention tag 20 for a retail article according to the first embodiment is attached to another retail article (drinking water PET bottle) 24a. FIG. 1C is a schematic perspective view showing a state in which the attention tag 20 for a retail article according to the first embodiment is attached to a further retail article (cup noodle) 24b. FIG. 2 is a plan view showing a configuration of an RFID tag 10 used for the attention tag 20 for a retail article according to the first embodiment. FIG. 3 is a schematic view showing a relationship between the RFID tag 10 and a metal body 24 when the attention tag 20 for a retail article of FIG. 1A is attached to the retail article 24 that is the metal body. It is noted that the drawings also show an x-y-z coordinate system having x-, y-, and z-axes orthogonal to each other for facilitating understanding of the exemplary embodiments. In this description, a z-axis direction is a thickness direction, an x-axis direction is a width direction, and a y-axis direction is a longitudinal direction of the attention tag 20 for a retail article.

According to the first embodiment the attention tag 20 includes a label part 21 having an adhesive region 23 configured to bond to the retail article 24 and a protruding region 22 that protrudes or extends from the retail article when the adhesive regions 23 is secured thereto, and the RFID tag 10 disposed on the label part 21. The RFID tag 10 has an RFIC element 1 and an antenna pattern having a first antenna part or portion 3a and a second antenna part or portion 3b respectively connected to a first end and a second end of the RFIC element 1. The first antenna part 3a of the RFID tag is disposed in the protruding region 22 of the label part 21, and the second antenna part 3b of the RFID tag 10 is disposed in the adhesive region 23 of the label part 21 at a position facing at least a portion of the retail article 24 via the label part 21 when the RFID tag 10 is bonded to the retail article 24.

As shown in FIG. 3, when the retail article 24 is a metal body, the second antenna part 3b is configured to be capacitively coupled to the metal body 24 via the label part 21. As a result, the metal body 24 can be configured as a booster antenna, so that a high antenna gain is obtained even when the retail article is the metal body 24 (FIG. 1A). It is noted that the high antenna gain is obtained in both cases when the retail article is a drinking water PET bottle 24a having a high permittivity (FIG. 1B) and when the retail article is a cup of noodles 24b having a low permittivity (FIG. 1C).

Constituent members constituting the attention tag 20 for a retail article will hereinafter be described.

<Attention Tag for Retail Article>

The attention tag 20 for a retail article is a label attached to the retail article 24 to make the article noticeable. This attention tag 20 for a retail article protrudes from the retail article 24 and is exposed in a space rather than being disposed along a surface of the retail article 24. The attention tag 20 for a retail article includes the label part 21 and the RFID tag 10 disposed on the label part 21.

<Retail Article>

The retail article can be a metal body, for example, as in the case of a bag body made of aluminum foil or the metal can 24 (FIG. 1A), an article having a high permittivity, for example, as in the case of the drinking water PET bottle 24a, or an article having a high permittivity, for example, as in the case of the cup of noodles 24b (FIG. 1C). It should be appreciated that the above examples are merely exemplary, and the present invention is not limited thereto.

<Label Part>

The label part 21 has the adhesive region 23 bonded to the retail article 24 and the protruding region 22 that protrudes from the retail article 24. In an exemplary aspect, the label part 21 may be made of paper or PET film, for example.

The protruding region 22 of the label part 21 protrudes away from the surface of the retail article 24 into a space (e.g., above the retail article 24). The protruding region 22 of the label part 21 is provided with the first antenna part 3a of the RFID tag. When considering contact with other retail articles, a protruding length of the protruding region 22 is preferably 30 mm or less, more preferably 20 mm or less.

The adhesive region 23 of the label part 21 is provided with an adhesive and is attached to the retail article 24. The adhesive is preferably an insulating adhesive. In the adhesive region 23 of the label part 21, the second antenna part 3b of the RFID tag 10 is disposed at a position facing a portion of the retail article 24 via the label part 21.

<RFID Tag>

FIG. 2 is a plan view showing the configuration of the RFID tag 10. The RFID tag 10 has the RFIC element 1 and the antenna pattern having the first antenna part 3a and the second antenna part 3b respectively connected to a first end 2a and a second end 2b of the RFIC element 1. The first antenna part 3a l is a loop 4a connecting the first end 2a and the second end 2b of the RFIC element 1. As shown, the second antenna part 3b is a lead part 4b protruding from the vicinity of the other end portion 2b. Therefore, the RFID tag 10 has a so-called tadpole shape having the loop part 4a and the lead part 4b. In this aspect, the term "tadpole shape" means, for example, a shape having a circular or elliptical main body and a tail that extends from the main body portion. Alternatively, the shape can be expressed as a "ladle shape" or a "spoon shape". The first antenna part 3a of the RFID tag is disposed in the protruding region 22 of the label part 21. The second antenna part 3b of the RFID tag 10 is disposed in the adhesive region 23 of the label part 21 at a position facing a portion of the retail article 24 via the label part 21. As a result, when the retail article 24 is a metal body, the second antenna part 3a and the metal body 24 are capacitively coupled via the label part 21. Therefore, the metal body 24 can be used as a booster antenna. On the other hand, the first antenna part 3a is protruded from the surface of the metal body 24, and the first antenna part 3a itself can function as a radiation electrode. The first antenna part 3a can also function as an excitation electrode.

Constituent elements of the RFID tag 10 will hereinafter be described.

<RFIC Element>

Figure 4A:
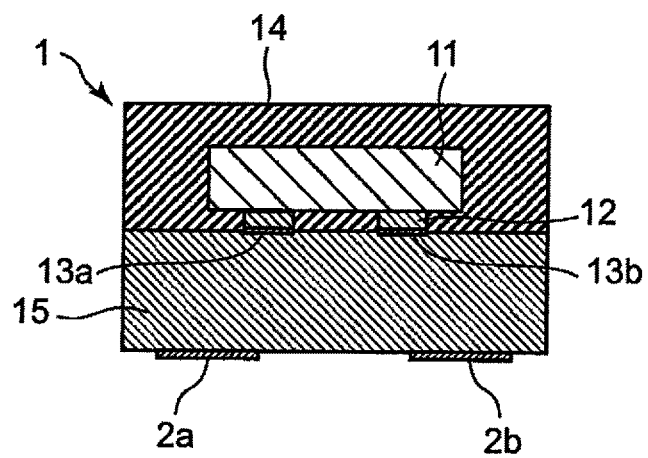
FIG. 4A is a schematic cross-sectional view showing a cross-sectional structure of an RFIC element included in the RFID tag of FIG. 2.
Figure 4B:
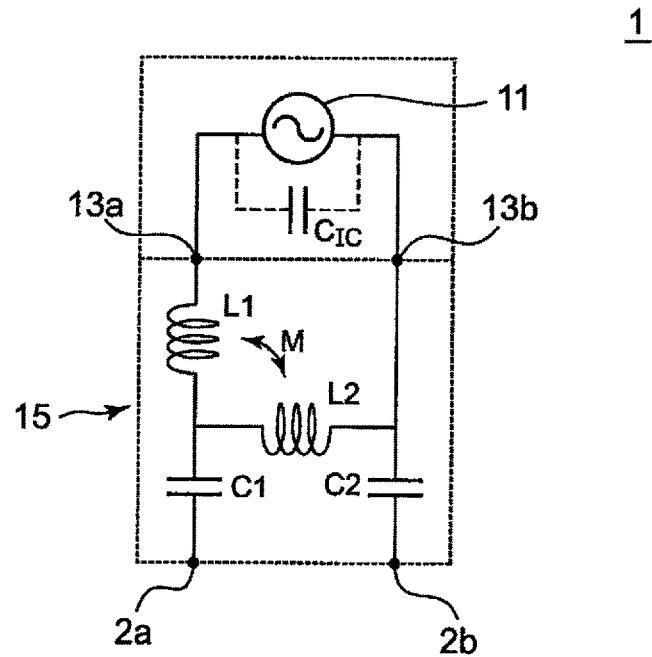
FIG. 4B is an equivalent circuit diagram of the RFIC element of FIG. 4A.

FIG. 4A is a schematic cross-sectional view showing a cross-sectional structure of the RFIC element 1. FIG. 4B is an equivalent circuit diagram of FIG. 4A.

The RFIC element 1 is configured as an RFIC package having an RFIC chip 11 for processing an RFID signal and a multilayer board 15 for mounting the RFIC chip 11. The RFIC chip 11 may have a memory circuit and a signal processing circuit built-in and may be sealed with a sealing resin 14 made of an epoxy resin etc. The RFIC chip 11 is mounted on the multilayer board 15 formed by a power feeding circuit (matching circuit) via a conductive bonding material 12 and a terminal electrode 13. The power feeding circuit (matching circuit) can be formed in a multilayer board shape according to an exemplary aspect.

The multilayer board 15 is a ceramic multilayer board made of a ceramic material such as LTCC and includes a built-in power feeding circuit made up of L patterns such as L1 and L2 and C patterns such as C1, C2, and $C_{IC}$. $C_{IC}$ is a stray capacitance of the RFIC chip 11. A resonance circuit is formed by the power feeding circuit (matching circuit) and has a resonance frequency corresponding to a carrier frequency. By disposing the power feeding circuit (matching circuit) as described above, the center frequency of the carrier frequency can be prevented from significantly changing even if the electrical length of the second antenna part 3a varies due to the second antenna part 3b of the RFID tag 10 and the metal material 24 connected thereto. The multilayer board 15 is connected via terminal electrodes 2a, 2b to the first antenna part 3a and the second antenna part 3b.

<Antenna Pattern>

The antenna pattern has the first antenna part 3a and the second antenna part 3b respectively connected to the first and second ends of the RFIC element 1. The first antenna part 3a and the second antenna part 3b have shapes asymmetrical to each other about the RFIC element 1. This antenna pattern is referred to as an asymmetric dipole or a deformed dipole.

<First Antenna Part>

The first antenna part 3a is the loop part 4a connecting the first end and the second end of the RFIC element 1. The loop part 4a itself functions as a radiation electrode and also functions as an excitation electrode constituting a matching circuit defining the resonance frequency. Additionally, the loop part 4a functioning as a radiation electrode can improve directivity.

<Second Antenna Part>

When the retail article is not a metal body, the second antenna part 3b itself functions as a radiation electrode as shown in FIGS. 1B and 1C. On the other hand, when the retail article is a metal body, as shown in FIGS. 1A and 3, the second antenna part 3b is capacitively coupled to the metal body 24 via the label part 21 in an area extending from a contact point 5 with the metal body 24 to an end portion. As a result, the metal body 24 can be configured as a booster antenna. When the metal body 24 is a metal can, a carrier can be received or radiated over the entire circumference thereof. Consequently, even if the retail article is the metal body 24, the RFID tag 10 can receive and radiate a carrier without being shielded. Therefore, the RFID tag 10 included in the attention tag for a retail article attached to the retail article 24 can be read even when reading is performed in one direction, for example.

For the first antenna part 3a and the second antenna part 3b, any materials used for ordinary antenna elements can be used, including, for example, a copper foil, a copper plate, a copper plating film, a gold foil, a gold plate, and a gold plating film. The materials are not limited to the example and can be any materials usually used.

<Connection between Retail Article and RFID Tag>

As shown in FIGS. 1A, 1B, and 1C, the connection between the retail article 24 and the second antenna part 3b of the RFID tag 10 is capacitive coupling via the label part 21.

Second Embodiment

Figure 5:
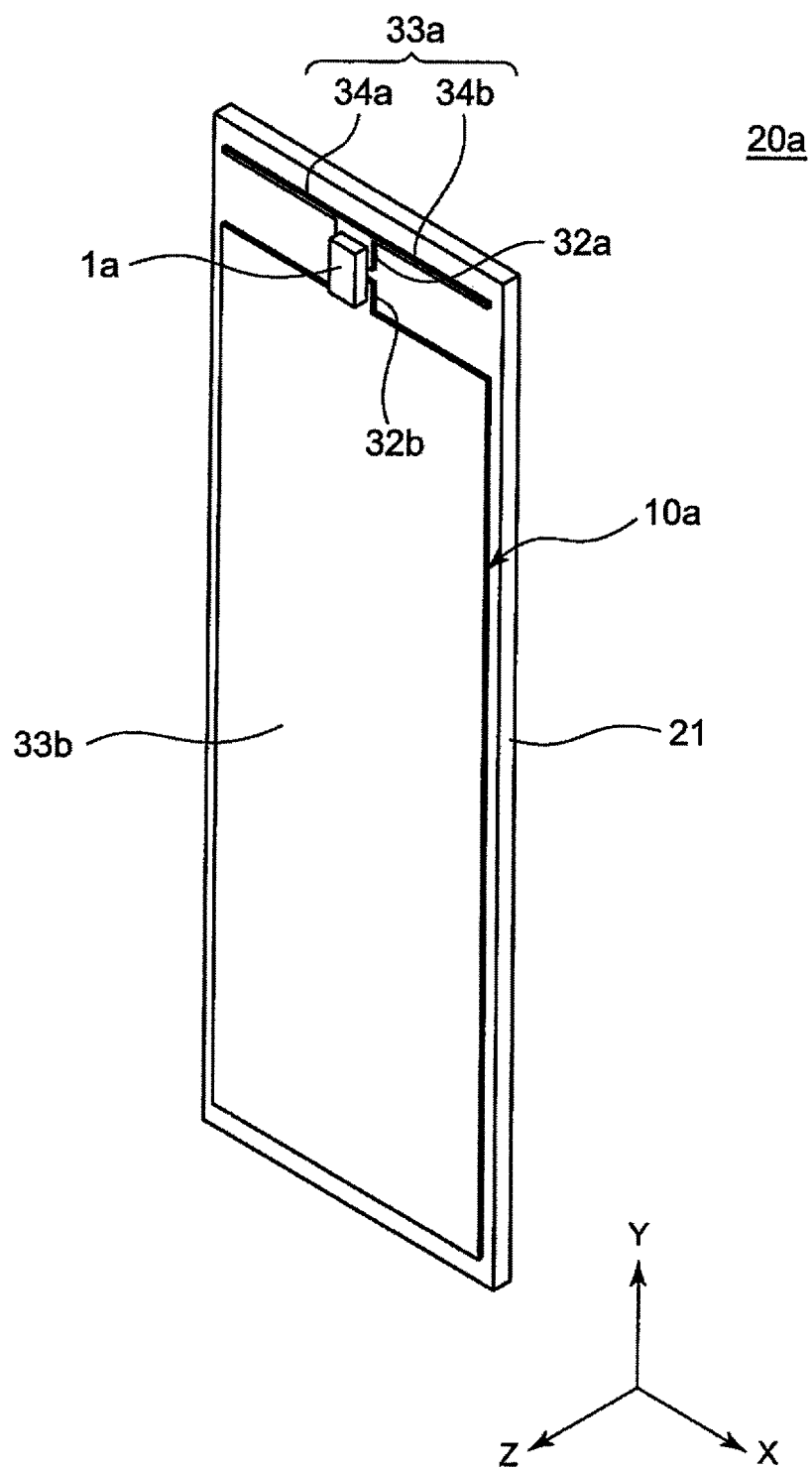
FIG. 5 is a schematic perspective view showing a configuration of an attention tag for a retail article according to a second exemplary embodiment.
Figure 6:
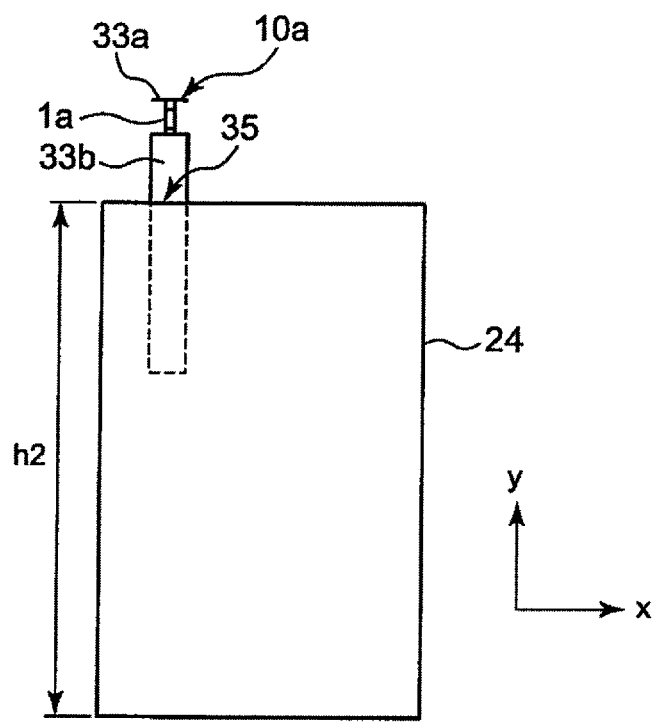
FIG. 6 is a schematic view showing a relationship between an RFID tag and a metal body when the attention tag for a retail article of FIG. 5 is attached to a retail article that is the metal body.
Figure 7A:
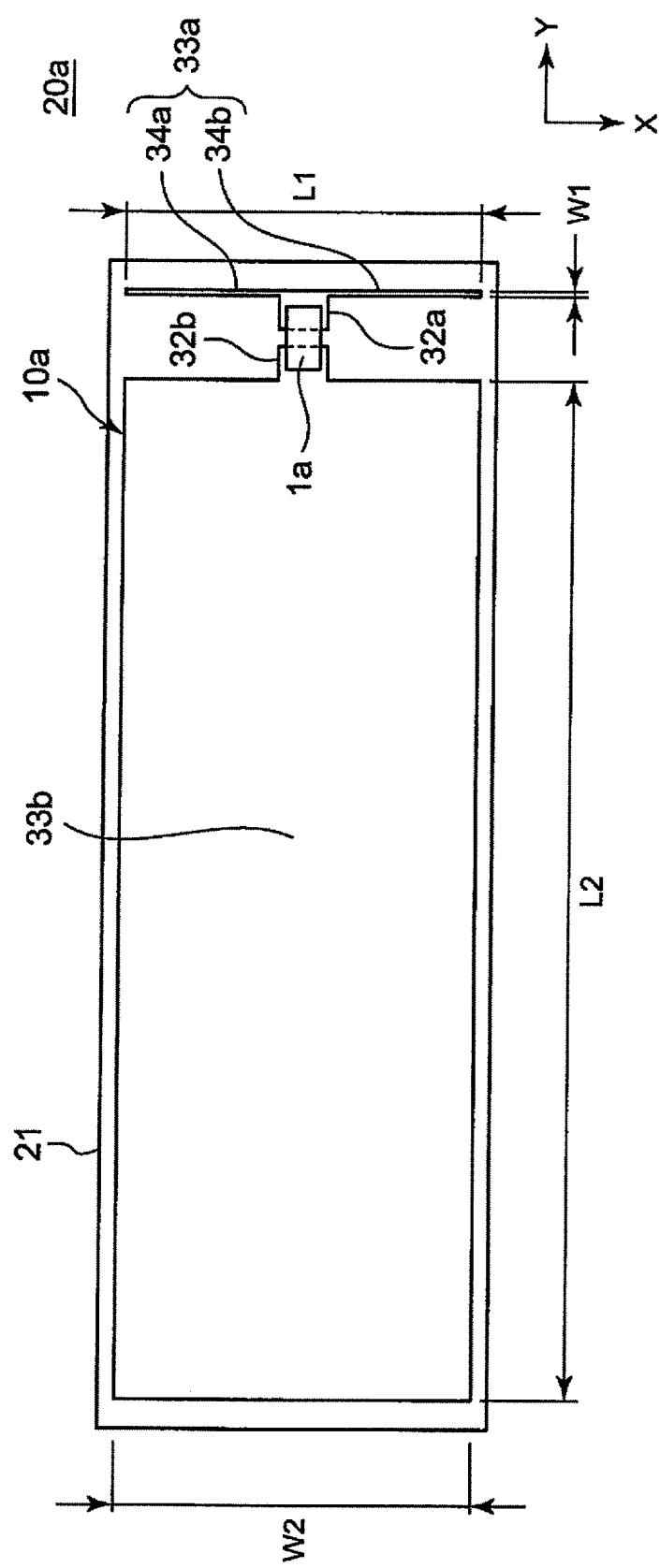
FIG. 7A is a plan view showing a configuration of the attention tag for a retail article according to the second exemplary embodiment.

FIG. 5 is a schematic perspective view showing a configuration of an attention tag 20a for a retail article according to a second exemplary embodiment. FIG. 6 is a schematic view showing a relationship between an RFID tag 10a and the metal body 24 when the attention tag 20a for a retail article of FIG. 5 is attached to the retail article 24 that is the metal body. FIG. 7A is a plan view showing a configuration of the attention tag 20a for a retail article according to the second embodiment. FIG. 7B is a schematic cross-sectional view of FIG. 7A. FIG. 8 is an equivalent circuit diagram of the RFID tag 10a included in the attention tag 20a for a retail article of FIG. 7A. It is again noted that the drawings also show an x-y-z coordinate system having x-, y-, and z-axes orthogonal to each other for facilitating understanding of the invention. In this description, a z-axis direction is a thickness direction, an x-axis direction is a width direction, and a y-axis direction is a longitudinal direction of the attention tag 20a for a retail article.

The attention tag 20a for a retail article according to the second embodiment is different from the attention tag for a retail article according to the first embodiment in that a first antenna part 33a does not include a loop part connecting one end portion and the other end portion of an RFIC element 1a.

As shown in FIG. 6, the RFID tag 10a included in the attention tag 20a for a retail article according to the second embodiment has a second antenna part 33b capacitively coupled to the metal body 24 via the label part 21. Therefore, the metal body 24 can be used as a booster antenna. Consequently, a high antenna gain is obtained even when the retail article is the metal body 24.

The RFID tag 10a included in the attention tag 20a for a retail article shown in FIG. 5 is an RFID (Radio Frequency Identification) tag performing wireless communication at a carrier frequency in the UHF band, for example, 900 MHz, and is attached to various retail articles before use.

The attention tag 20a for a retail article includes the label part 21 and the RFID tag 10a disposed on a principal surface of the label part 21. As shown, the RFID tag 10a has the RFIC element 1a and first and second antenna parts 33a, 33b. The label part 21 has a rectangular thin plate shape in planar view including the principal surface and a back surface (attachment surface) opposite and parallel to the principal surface and has a uniform thickness. The label part 21 is made of a dielectric material having a low permittivity (preferably a permittivity of 10 or less). The label part 21 is made of, for example, a flexible dielectric material such as polyethylene terephthalate (PET), fluorine resin, urethane resin, or paper. The label part 21 may be made of a dielectric material and a magnetic material.

As shown in FIG. 7A, the first antenna part 33a, the second antenna part 33b, and the RFIC element 1a are disposed on the principal surface side of the label part 21. On the other hand, as shown in FIG. 7B, the attachment surface on the back surface has no electrode etc. disposed thereon and functions as a means attached to the metal body of the retail article. A seal layer for affixing to the retail article 24 is disposed on the attachment surface of the label part 21. The label part 21 allows the first and second antenna parts 33a, 33b to face the metal body of the retail article 24 at a predetermined distance corresponding to the thickness of the label part 21. Therefore, the label part 21 serves as a spacer for disposing the second antenna part 33b at a distance from the metal body of the retail article.

The first and second antenna parts 33a, 33b are, for example, a copper film, an aluminum film, etc., and are made of a flexible and conductive material. In the case of this embodiment, the first and second antenna parts 33a, 33b are in a rectangular shape including a longitudinal direction and a lateral direction.

Moreover, the first and second antenna parts 33a, 33b face each other in the length direction (y-axis direction) of the RFID tag 10a. Specifically, the second antenna part 33b is independent of the first antenna part 33a, i.e., separated at a distance from the first antenna part 33a in terms of shape.

As shown in FIG. 7A, the first antenna part 33a includes two T-shaped portions 34a, 34b extending in the width direction (x-axis direction), has a length l1 and a width W1 (l1>W1), and extends along the principal surface in the width direction (x-axis direction) of the RFID tag 10a. On the other hand, the second antenna part 33b has a length l2 and a width W2 (l2>W2) and extends along the principal surface in the length direction (Y-axis direction) of the RFID tag 10a. Therefore, on the principal surface, the first and second antenna part 33a, 33b extend in the directions intersecting with each other, for example, in the directions shifted by 90 degrees from each other.

The width W1 of the first antenna part 33a is smaller than the width W2 of the second antenna part 33b. The length l1 (the length in the extending direction) of the first antenna part 33a is shorter than the length l2 of the second antenna part 33b. Therefore, the size (size in top view) of the first antenna part 33a is smaller than the size of the second antenna part 33b.

For this embodiment, it is noted that preferably the length l1 of the first antenna part 33a is substantially equal to the width W2 of the second antenna part 33b. Therefore, the RFID tag 10a is made compact in the size in the width direction (X-axis direction).

Furthermore, the first and second antenna parts 33a, 33b include land portions 32a, 32b for connection to the RFIC element 1a. The respective land portions 32a, 32b are disposed to face each other between the first and second antenna parts 33a, 33b.

FIG. 8 shows an equivalent circuit of the RFID tag attached to the retail article (metal body) 24.

As shown in FIG. 8, a stray capacitance C11 exists between the first antenna part 33a and a portion of the metal body (the portion facing the first antenna part 33a). A stray capacitance C12 exists between the second antenna part 33b and a portion of the metal body 24 (the portion facing the second antenna part 33b). This stray capacitance C12 and a parasitic inductor L5 of the second antenna part 33b forms a parallel resonance circuit having a predetermined frequency (e.g., 900 MHz) as the resonance frequency.

The RFIC element 1a will be described.

The RFIC element 1a shown in FIG. 8 is an RFIC element corresponding to a communication frequency of, for example, the 900 MHz band, i.e., the UHF band. The RFIC element 1a may have flexibility. The RFIC element 1a has an RFIC chip 11 and a matching circuit 18 for impedance matching between the RFIC chip 11 and the first and second antenna parts 33a, 33b. The matching circuit 18 has coil parts L3, L4 connecting between first and second input/output terminals 2a, 2b. This corresponds to the fact that the loop part of the first antenna part of the first embodiment is incorporated in the RFIC element 1a, for example. In this case, a loop part constituting the matching circuit as in the first embodiment may not be disposed in the first antenna part 33a. Although functioning as a portion of the matching circuit 18, the coil parts L3, L4 in the RFIC element 1a do not function as a radiating part.

The RFIC chip 11 includes first and second input/output terminals 13a, 13b. The first input/output terminal 13a is connected to the first antenna part 33a via the matching circuit 18. The second input/output terminal 13b is connected to the second antenna part 33b via the matching circuit 18.

When the first and second antenna parts 33a, 33b acting as an antenna receive a high-frequency signal from the outside, the RFIC chip 11 is activated in response to a supply of a current induced by the reception. The activated RFIC chip 11 generates a high-frequency signal and outputs the generated signal as a radio wave through the first and second antenna parts 33a, 33b to the outside.

Third Embodiment

Figure 9A:
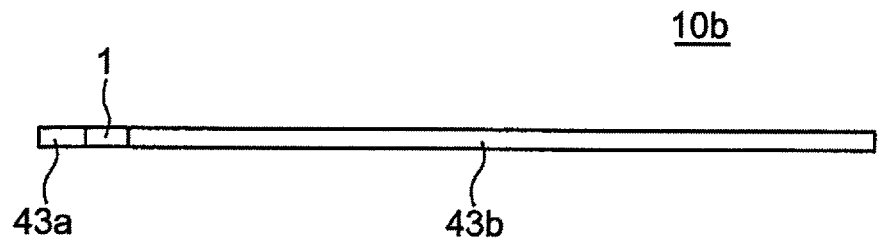
FIG. 9A is a plan view showing a configuration of an RFID tag included in an attention tag for a retail article according to a third exemplary embodiment.
Figure 9B:
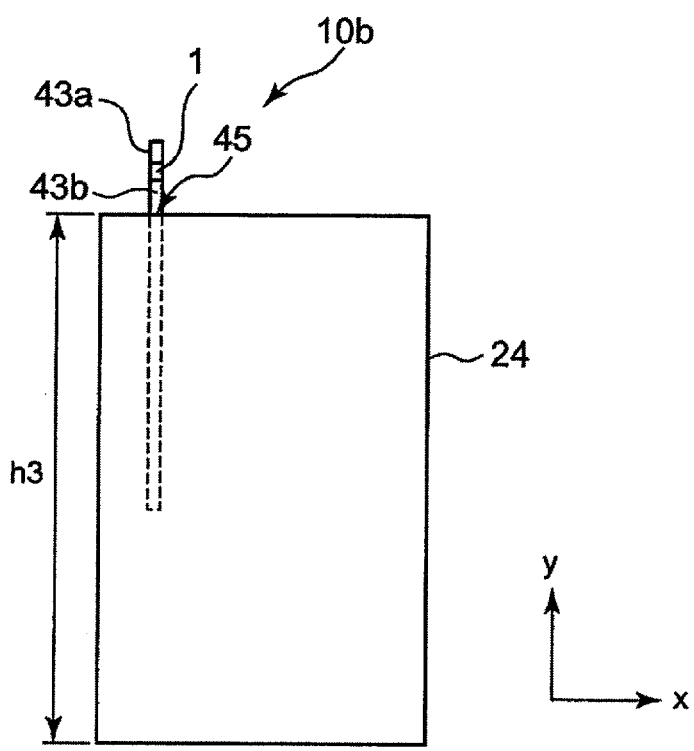
FIG. 9B is a schematic view showing a relationship between the RFID tag and a metal body when the attention tag for a retail article according to the third exemplary embodiment is attached to a retail article that is the metal body.

FIG. 9A is a plan view showing a configuration of an RFID tag 10b included in an attention tag for a retail article according to a third exemplary embodiment. FIG. 9B is a schematic view showing a relationship between the RFID tag 10b and the metal body 24 when the attention tag for a retail article according to the third embodiment is attached to the retail article 24 that is the metal body.

The RFID tag 10b included in the attention tag for a retail article according to the third embodiment is different from the RFID tag included in the attention tag for a retail article according to the first embodiment in that a first antenna part 43a does not include a loop part connecting the first end and the second end of the RFIC element 1. This RFID tag 10b is not a usual dipole in which the antenna parts have the same length on both sides and is an asymmetric dipole in which the first antenna part 43a is shorter than the second antenna part 43b. An RFID tag using this asymmetric dipole is referred to as a single terminal tag. The single terminal tag is as described in, for example, WO 2015/111466, WO 2012/093541, and WO 2012/117843.

A usual symmetric dipole antenna has zero voltage and maximum current distribution at a center feeding point and can be implemented with low impedance. On the other hand, this single terminal tag (asymmetric dipole) includes the first antenna parts 43a and the second antenna part 43b having unbalanced lengths on the left and right and has non-zero voltage and low current distribution at the feeding point, resulting in high impedance. Therefore, normally, electric power is not transmitted due to impedance mismatch. In this regard, the RFIC element 1 used in this single terminal tag (asymmetric dipole) has a matching circuit inside and is capable of defining a resonance frequency corresponding to a communication frequency. Therefore, the high impedance in the single terminal tag (asymmetric dipole) can be dealt with, so that electric power can be transmitted.

The first antenna part 43a extends from the first end of the RFIC element 1 in a first direction and the second antenna part 43b extends from the second end of the RFIC element 1 in a second direction opposite to the first direction.

This first antenna part 43a is shorter than the second antenna part 43b and may function as an excitation electrode. The first antenna part 43a itself may function as a radiation electrode. The first antenna part 43a may have functions of both the excitation electrode and the radiation electrode.

When the retail article is not a metal body, the second antenna part 43b itself functions as a radiation electrode. On the other hand, when the retail article is a metal body, as shown in FIG. 9B, the second antenna part 43b is capacitively coupled to the metal body 24 via the label part in an area extending from a contact point 45 with the metal body 24 to an end portion. As a result, the metal body 24 can be used as a booster antenna. When the metal body 24 is a metal can, a carrier can be received or radiated over the entire circumference thereof. Consequently, even if the retail article is the metal body 24, the RFID tag 10 can receive and radiate a carrier without being shielded. Therefore, the retail article can be read even when reading is performed in one direction, for example.

For the first antenna part 43a and the second antenna part 43b, any materials used for ordinary antenna elements can be used, including, for example, a copper foil, a copper plate, a copper plating film, a gold foil, a gold plate, and a gold plating film. It should be appreciated that the materials are not limited to the example and can be any materials usually used.

Fourth Embodiment

Figure 10A:
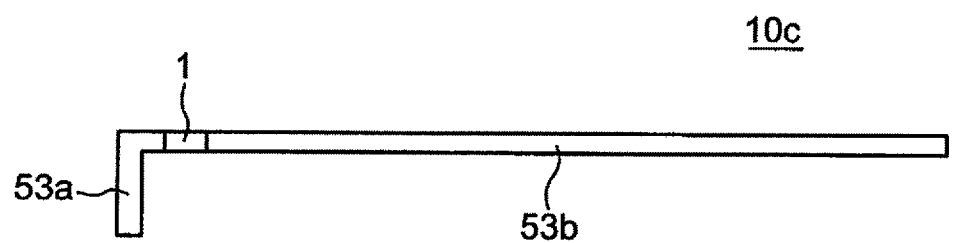
FIG. 10A is a plan view showing a configuration of an RFID tag included in an attention tag for a retail article according to a fourth exemplary embodiment.
Figure 10B:
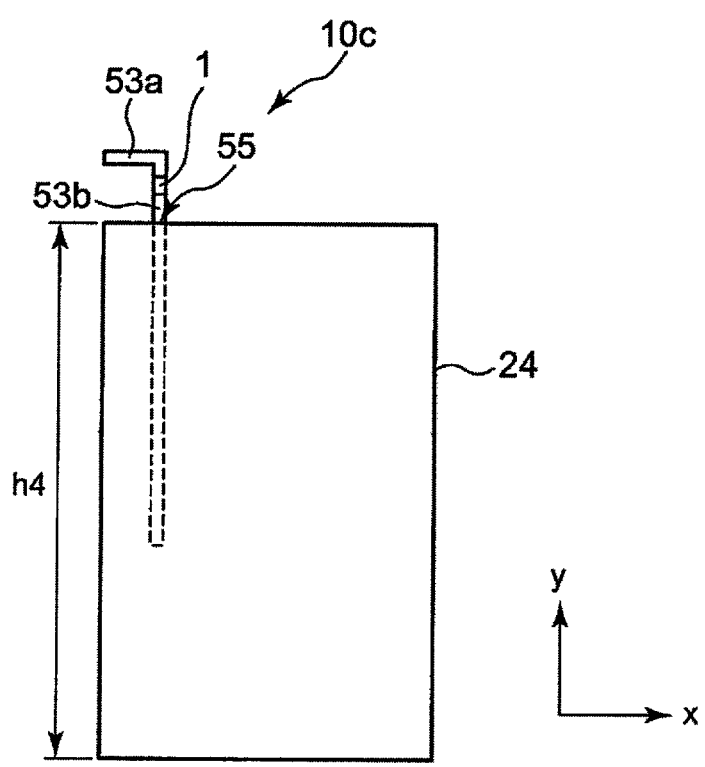
FIG. 10B is a schematic view showing a relationship between the RFID tag and a metal body when the attention tag for a retail article according to the fourth exemplary embodiment is attached to a retail article that is the metal body.

FIG. 10A is a plan view showing a configuration of an RFID tag 10c included in an attention tag for a retail article according to a fourth exemplary embodiment. FIG. 10B is a schematic view showing a relationship between the RFID tag 10c and the metal body 24 when the attention tag for a retail article according to the fourth embodiment is attached to the retail article 24 that is the metal body.

The RFID tag 10c included in the attention tag for a retail article according to the fourth embodiment is different from the RFID tag included in the attention tag for a retail article according to the third embodiment in that a first antenna part 53a is bent since the longitudinal direction changes in the middle. Specifically, the longitudinal direction of the first antenna part 53a changes 90° in the middle. Therefore, the overall electrical length can be made longer while suppressing the length of the first antenna part 53a with respect to the initial longitudinal direction. In other words, a protruding region protruding from the retail article 24 can be reduced in length.

Fifth Embodiment

Figure 11:
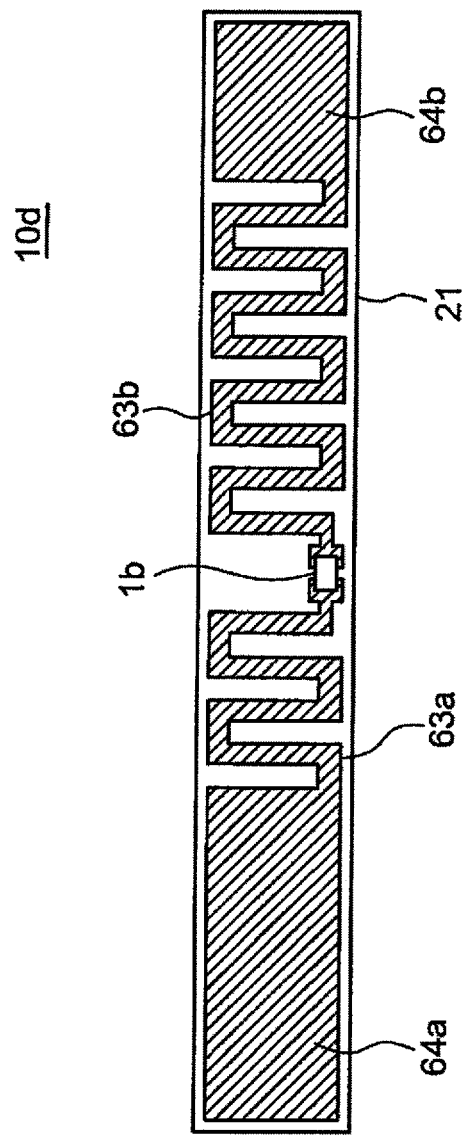
FIG. 11 is a plan view showing a configuration of an RFID tag included in an attention tag for a retail article according to a fifth exemplary embodiment.
Figure 12A:
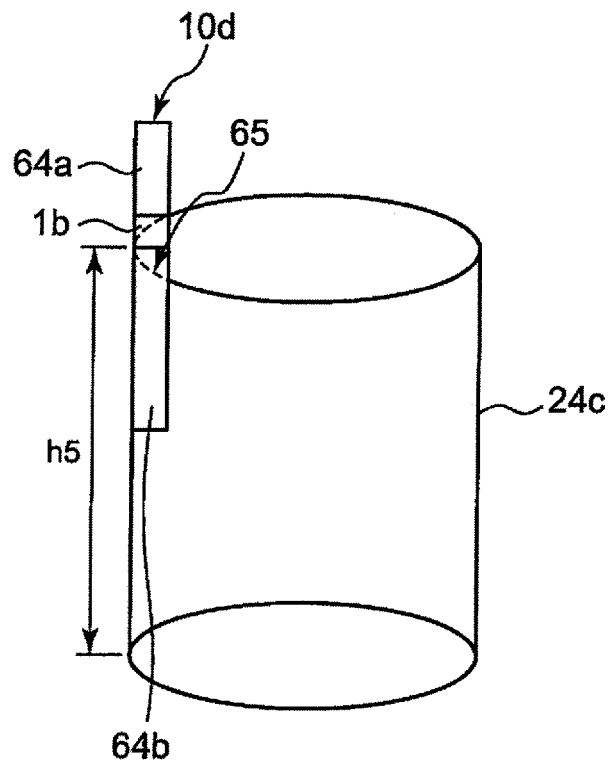
FIG. 12A is a schematic view showing a relationship between an RFID tag and a metal body when the attention tag for a retail article according to the fifth exemplary embodiment is attached to a retail article that is a long metal body.
Figure 12B:
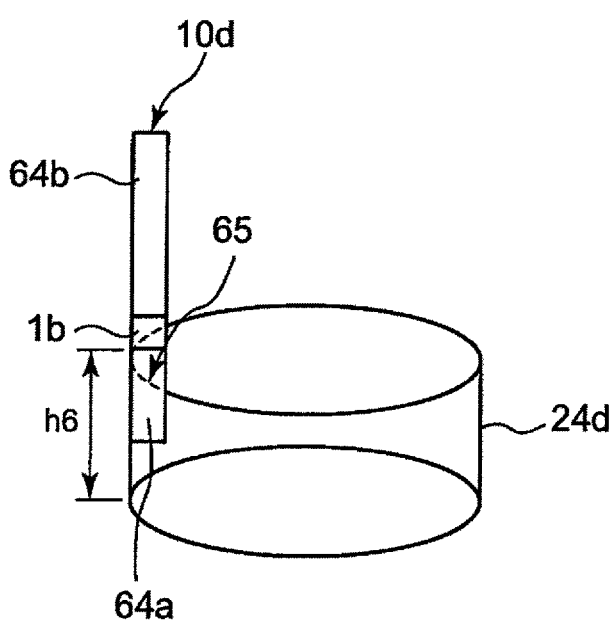
FIG. 12B is a schematic view showing a relationship between the RFID tag and a metal body when the attention tag for a retail article according to the fifth exemplary embodiment is attached to a retail article that is a short metal body.

FIG. 11 is a plan view showing a configuration of an RFID tag 10d included in an attention tag for a retail article according to a fifth exemplary embodiment. FIG. 12A is a schematic view showing a relationship between the RFID tag 10d and a metal body 24c when the attention tag for a retail article according to the fifth embodiment is attached to the retail article that is the long metal body 24c. FIG. 12B is a schematic view showing a relationship between the RFID tag 10d and a metal body 24d when the attention tag for a retail article according to the fifth embodiment is attached to the retail article that is the short metal body 24d.

The RFID tag 10d included in the attention tag for a retail article according to the fifth embodiment is different from the RFID tag included in the attention tag for a retail article according to the first embodiment in that a first antenna part 63a and a second antenna part 63b have a meandering shape. Since the antenna parts are formed into the meandering shape, the length in the longitudinal direction can be shortened while maintaining the whole electrical length. Additionally, an RFIC element 1b is different from the RFIC element in the first embodiment and the RFIC element in second embodiment in that a resonance frequency varies depending on connection of the first antenna part 63a and the second antenna part 63b to the metal body 24.

In this RFID tag 10d, the electrical length of the first antenna part 63a is made shorter than the electrical length of the second antenna part 63b. Additionally, an end portion 64a of the first antenna part 63a and an end portion 64b of the second antenna part 63b are each configured to enable capacitive coupling to the retail article 24. Therefore, in the RFID tag 10d, both the first antenna part 63a and the second antenna part 63b may capacitively be coupled to a metal body via the label part.

In the case shown in FIG. 12A, a length h5 of the metal body 24c is relatively long, and the sum of the electrical length of the first antenna part 63a and the length h5 of the metal body 24c is close to approximately λ/2 (15 cm to 16 cm) in terms of a wavelength λ of the carrier. In this case, the end portion 64b of the second antenna part 63b is capacitively coupled to the metal body 24c via the label part. As a result, the electrical length of the antenna pattern of the RFID tag 10d can be made closer to λ/2, and a sufficient communication distance can be maintained.

In the case shown in FIG. 12B, a length h6 of the metal body 24d is relatively short, and the sum of the electrical length of the first antenna part 63a and the length h6 of the metal body 24d is shorter than approximately λ/2 (15 cm to 16 cm) in terms of the wavelength λ of the carrier. In this case, the electrical length of the second antenna part 63b longer than the first antenna part 63a is used to capacitively couple the end portion of the first antenna part 63a to the metal body 24d via the label part. As a result, the electrical length of the antenna pattern of the RFID tag 10d can be made as close as possible to λ/2, and a sufficient communication distance can be maintained.

As described above, the RFIC element 1a of the RFID tag included in the attention tag for a retail article according to the fifth embodiment has the resonance frequency varying depending on the connection of the first antenna part 63a and the second antenna part 63b to the metal body 24. In this case, either the first antenna part 63a or the second antenna part 63b different in electrical length is capacitively coupled via the label part depending on the lengths h5, h6 of the metal bodies 24c, 24d. Therefore, the electrical length of the entire antenna pattern can be made closer to λ/2, and a sufficient communication distance can be maintained.

Sixth Embodiment

Figure 13A:
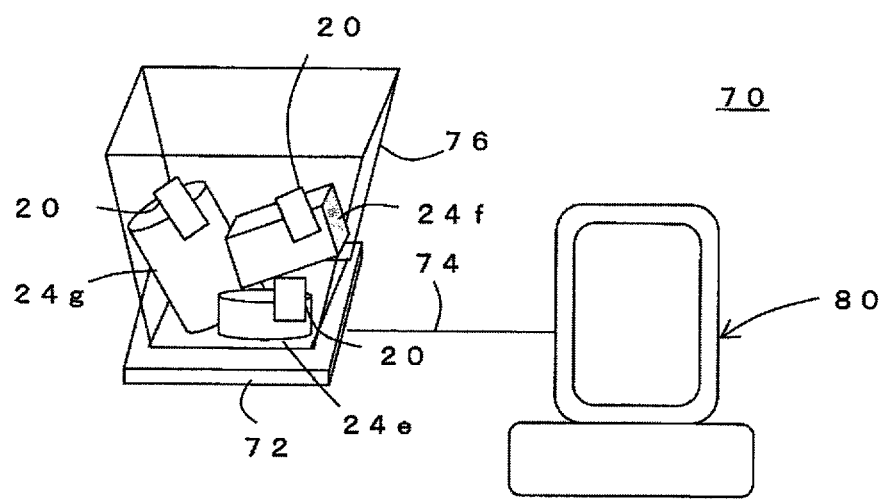
FIG. 13A is a schematic view generally showing an RFID tag reading system for a retail article according to a sixth exemplary embodiment.
Figure 13B:
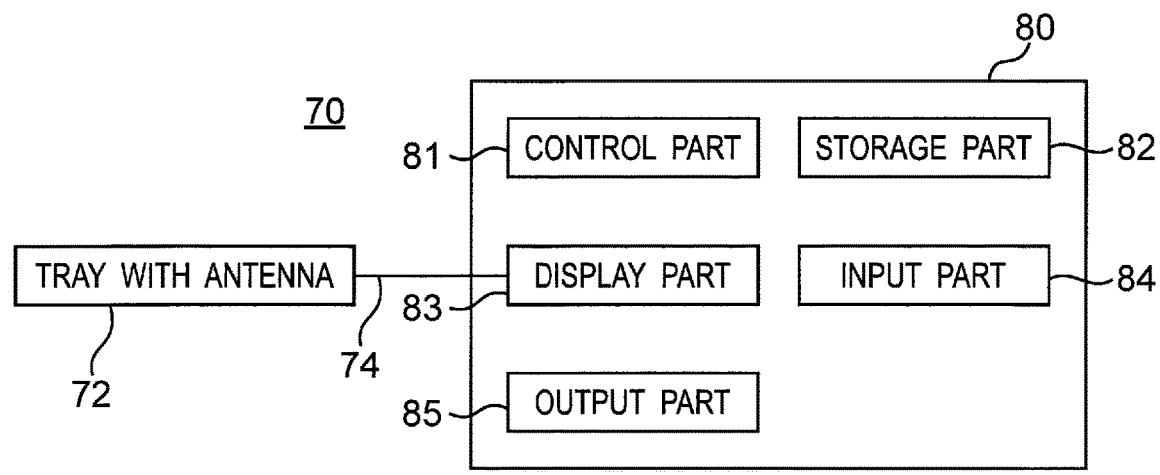
FIG. 13B is a block diagram of the RFID tag reading system for a retail article of FIG. 13A.

FIG. 13A is a schematic view generally showing an RFID tag reading system 70 for the retail article 24 according to a sixth exemplary embodiment. FIG. 13B is a block diagram of the RFID tag reading system 70 for the retail article 24 of FIG. 13A. FIG. 13A shows the case that a shopping basket has transparent side portions for convenience.

The RFID tag reading system 70 for the retail article 24 according to the sixth embodiment includes a tray 72 with an antenna and a reader 80 connected through a cable 74 to the tray 72 with an antenna. The tray 72 with an antenna has an antenna (not shown) for reading a normal RFID tag. The reader 80 has, for example, a control part 81, a storage part 82, a display part 83, an input part 84, and an output part 85. As shown in FIG. 13A, a shopping basket 76 contains retail articles 24e, 24f, and 24g having the attention tags 20 for retail articles according to the first embodiment attached thereto and is placed on the tray 72 with an antenna.

As described above, even when the retail article 24 is a metal body, the retail article 24 having the attention tag 20 for a retail article attached thereto allows the second antenna part of the RFID tag to capacitively couple to the metal body 24 so that the metal body itself can be used as a booster antenna.

Therefore, the RFID tag reading system 70 can read each of the retail articles 24e, 24f, 24g having the attention tags 20 for retail articles attached thereto in the shopping basket 76. Specifically, although overlapping each other in the shopping basket 76, each of the retail articles 24e, 24f, 24g can be read from one direction of the tray 72 with an antenna, for example, from vertically below in the case of FIG. 13A, without being shielded by the retail articles 24e, 24f, 24g that are metal bodies. As a result, the number of antennas disposed for checkout of retail articles can be reduced.

Instead of only one antenna, multiple antennas may be disposed as needed.

The RFID tag reading system 70 is not limited to a desktop type and may be a handy type, for example. In this case, while retail articles are placed on a display shelf, the tray 72 with an antenna can be brought close to the display shelf to read the RFID tag included in the attention tag 20 for a retail article attached to each of the retail articles. This eliminates the need for picking up the retail articles one by one from the display shelf so that the retail articles can easily be inventoried.

According to the attention tag for a retail article shown in FIG. 5 and the attention tag for a retail article including the RFID tag shown in FIG. 9A, the matching circuit is disposed in the package, and the loop part functioning also as a matching circuit is not disposed outside. As a result, the matching circuit is not affected by a material or an affixed position of the retail article, so that communication characteristics are stabilized.

It is generally noted that the attention tag for a retail article is sometimes referred to as a "flag type tag".

The present disclosure includes appropriately combining arbitrary embodiments and/or examples of the various embodiments and/or examples described above, and the effects of the respective embodiments and/or examples can be produced.

According to the attention tag for a retail article and the retail article having the same attached thereto, even when the retail article is a metal body, the metal body can be used as a booster antenna by the second antenna part disposed in the adhesive region of the label part at a position facing a portion of the retail article, so that a high antenna gain is obtained regardless of a material of the retail article.

EXPLANATIONS OF LETTERS OR NUMERALS

1 RFIC element
2a first input/output terminal (terminal electrode)
2b second input/output terminal (terminal electrode)
3 antenna pattern
3a first antenna part
3b second antenna part
4a loop part
4b lead part
10, 10a, 10b, 10c, 10d wireless communication device (RFID tag)
11 RFIC chip
12 conductive bonding material
13 terminal electrode
14 sealing resin
15 multilayer board
18 matching circuit
20, 20a, 20b attention tag
21 label part
22 protruding region
23 adhesive region
24, 24a, 24b, 24c retail article
32a first input/output terminal
32b second input/output terminal
33a, 43a, 53a, 63a first antenna part
33b, 43b, 53b, 63b second antenna part
34a first-antenna first branch portion
34b first-antenna second branch portion
35, 45, 55, 65 contact point with metal body
64a first-antenna wide portion
64b second-antenna wide portion
70 RFID tag reading system
72 tray with antenna
74 cable
76 shopping basket
80 reader
81 control part
82 storage part
83 display part
84 input part
85 output part

The invention claimed is:

1. An attention tag for a retail article comprising:
a label having a plate shape in a planar view thereof and including an adhesive region on a surface thereof that is configured to bond to a retail article and a protruding region that extends from the retail article when the adhesive region of the label is bonded thereto; and
an RFID tag disposed on the label and including an RFIC element and an antenna pattern including a first antenna portion and a second antenna portion respectively connected to first and second ends of the RFIC element,
wherein the first antenna portion is disposed in the protruding region of the label and includes two T-shaped portions that extend in opposite directions from each other, and
wherein the second antenna portion is disposed in the adhesive region of the label at a metal body included in the retail article and is capacitively coupled to the metal body so that the metal body is configured as a booster antenna when the adhesive region of the label is bonded thereto.

2. The attention tag according to claim 1, wherein the first antenna portion and the second antenna portion each have shapes that are asymmetrical to each other about the RFIC element.

3. The attention tag according to claim 1, wherein the second antenna portion is a lead that extends from the second end of the RFIC element.

4. The attention tag according to claim 1, wherein the first antenna portions extends from the first end of the RFIC element in a first direction and the second antenna portion extends from the second end of the RFIC element in a second direction that faces in an opposite direction to the first direction.

5. The attention tag according to claim 1, wherein the first antenna portion extends in a longitudinal direction that is substantially orthogonal to a longitudinal direction of the second antenna portion.

6. The attention tag according to claim 1, wherein the RFIC element is configured as an RFIC package that includes an RFIC chip and a matching circuit connected to the RFIC chip.

7. The attention tag according to claim 6, wherein the matching circuit is configured to define a resonance frequency that correspond to a communication frequency.

8. The attention tag according to claim 1, wherein the first antenna portion comprises an electrical length that is shorter than an electrical length of the second antenna portion.

9. The attention tag according to claim 1, wherein the label part is configured to attach to the retail article with an insulating adhesive.

10. The attention tag according to claim 1, wherein the first antenna portion protrudes from a surface of the metal body when the adhesive region of the label is bonded to the retail article, such that the first antenna portion is configured as at least one of a radiation electrode and an excitation electrode.

11. The attention tag according to claim 1, wherein the label has a rectangular plate shape in the planar view thereof.

12. The attention tag according to claim 11, wherein the two T-shaped portions have a collective length extending in a widthwise direction of the rectangular plate shape of the label that is greater than a width of the two T-shaped portions extending in a lengthwise direction of the rectangular plate shape of the label, with the widthwise direction being perpendicular to the lengthwise direction.

13. The attention tag according to claim 12, wherein the second antenna portion has a width extending in the widthwise direction that is shorter than a length of the second antenna portion that extends in the lengthwise direction.

14. The attention tag according to claim 13, wherein the width of the second antenna portion is substantially equal to the collective length of the two T-shaped portions.

15. An attention tag configured to be attached to a retail article, the attention tag comprising:
a label having a plate shape in planar view thereof and including an adhesive region on a surface thereof that is configured to bond to a retail article and a protruding region that extends from a surface of the retail article when the label is bonded thereto;

an RFIC element that includes a multilayer board and an RFIC chip mounted thereto and configured to process an RFID signal, wherein the RFIC element comprises first and second terminals on opposing sides of the multilayer board; and an antenna pattern that includes a first antenna and a second antenna that are respectively connected to the first and second terminals of the RFIC element, wherein the first antenna is disposed in the protruding region of the label and is configured as at least one of a radiation electrode and an excitation electrode, with the first antenna including two T-shaped portions that extend in opposite directions from each other, and wherein the second antenna is disposed in the adhesive region of the label at a position facing at least a metal body included in the retail article and is capacitively coupled to the metal body so that the metal body is configured as a booster antenna when the label is bonded to the retail article.

16. The attention tag according to claim 15, wherein the first and second antennas have shapes that are asymmetrical to each other about the RFIC element.

17. The attention tag according to claim 15, wherein the second antenna is a lead that extends from the second end of the RFIC element.

18. The attention tag according to claim 15, wherein the RFIC element is configured as an RFIC package that includes the RFIC chip and a matching circuit connected to the RFIC chip, with the matching circuit configured to define a resonance frequency that correspond to a communication frequency.

19. The attention tag according to claim 15, wherein the first antenna comprises an electrical length that is shorter than an electrical length of the second antenna.

20. The attention tag according to claim 15, wherein the label has a rectangular plate shape in the planar view thereof.

* * * * *